United States Patent [19]
Harman et al.

[11] Patent Number: 5,481,640
[45] Date of Patent: Jan. 2, 1996

[54] TOOL FOR FUSING OPTICAL FIBERS

[75] Inventors: Murray R. Harman, Gloucester; James D. Marshall, Stittsville; Gordon A. Clark, Nepean, all of Canada

[73] Assignee: Fiberlign Division of Preformed Line Products (Canada) Ltd., Napean, Canada

[21] Appl. No.: 289,291

[22] Filed: Aug. 11, 1994

Related U.S. Application Data

[63] Continuation of Ser. No. 266,205, Jun. 27, 1994.

[51] Int. Cl.$^6$ .................................................. G02B 6/255
[52] U.S. Cl. .......................... 385/147; 385/96; 385/137; 219/383; 65/501
[58] Field of Search ...................................... 385/147, 136, 385/137, 95–99, 33, 36, 41, 42; 219/383; 65/509, 501, 407, 152

[56] References Cited

U.S. PATENT DOCUMENTS

| | | | |
|---|---|---|---|
| 4,033,668 | 7/1977 | Presby | 385/95 |
| 4,049,414 | 9/1977 | Smith | 65/407 |
| 4,152,190 | 5/1979 | Kurosawa et al. | 156/366 |
| 4,199,223 | 4/1980 | Yannoni | 385/134 |
| 4,220,394 | 9/1980 | Tardy | 385/64 |
| 4,266,852 | 5/1981 | Higgins et al. | 385/96 |
| 4,274,707 | 6/1981 | Pacey et al. | 385/139 |
| 4,326,870 | 4/1982 | Bendit et al. | 65/407 |
| 4,350,867 | 9/1982 | Kinoshita et al. | 219/121.63 |
| 4,416,506 | 11/1983 | Johnson et al. | 385/137 |
| 4,423,923 | 1/1984 | Frazier et al. | 385/45 |
| 4,433,896 | 2/1984 | Frazier | 385/51 |
| 4,487,475 | 12/1984 | Ogawa | 385/95 |
| 4,537,468 | 8/1985 | Degoix et al. | 385/96 |
| 4,548,669 | 10/1985 | Steinmann et al. | 156/358 |
| 4,557,557 | 12/1985 | Gleason et al. | 385/140 |
| 4,561,719 | 12/1985 | Quan | 385/98 |
| 4,662,962 | 5/1987 | Malavielle | 156/158 |
| 4,664,732 | 5/1987 | Campbell et al. | 156/158 |
| 4,687,287 | 8/1987 | Lukas et al. | 385/134 |
| 4,695,306 | 9/1987 | Kakoun et al. | 65/152 |
| 4,727,237 | 2/1988 | Schantz | 219/121.63 |
| 4,735,481 | 4/1988 | Lukas et al. | 385/139 |
| 4,736,632 | 4/1988 | Case | 73/827 |
| 4,758,061 | 7/1988 | Horn | 385/62 |
| 4,810,054 | 3/1989 | Shinbori et al. | 385/96 |
| 4,832,438 | 5/1989 | Engel et al. | 385/63 |
| 4,877,303 | 10/1989 | Caldwell et al. | 385/65 |
| 4,906,810 | 3/1990 | Sharma et al. | 219/121.46 |
| 4,920,366 | 4/1990 | Bowen et al. | 385/55 |
| 4,964,688 | 10/1990 | Caldwell et al. | 385/66 |
| 4,964,689 | 10/1990 | Wichansky | 385/66 |
| 4,969,705 | 11/1990 | Stoy et al. | 385/96 |
| 5,002,351 | 3/1991 | Szanto et al. | 385/96 |
| 5,134,470 | 7/1992 | Ravetti | 385/98 |
| 5,249,247 | 9/1993 | Whitesmith | 385/97 |

FOREIGN PATENT DOCUMENTS 53-149655  5/1978  Japan .

OTHER PUBLICATIONS

"Arc–fusion Splicing of Single Mode Fibers 2: A Practical Splice Machine", Applied Optics, vol. 21, No. 11, Jun. 1, 1982.

"Fusion Splices for Single–Mode Optical Fibers", IEEE Journal of Quantum Electronices, vol. QE–14, No. 8, Aug. 1978.

*Primary Examiner*—John D. Lee
*Assistant Examiner*—Phan T. H. Palmer
*Attorney, Agent, or Firm*—Fay, Sharpe, Beall, Fagan, Minnich & McKee

[57] ABSTRACT

A tool for fusing optical fibers is provided. The tool is preferably sized to be hand held and includes a housing having clamps that are positioned to engage recesses within a fusion sleeve placed in a chamber within the housing for holding down the sleeve. The housing includes a current source and conducting terminals for contacting and for providing an electric current to portions of the sleeve so that a heating element within the sleeve can fuse the first and second optical fibers together.

25 Claims, 3 Drawing Sheets

TOOL FOR FUSING OPTICAL FIBERS

CROSS REFERENCES TO RELATED APPLICATIONS

This application is a continuation-in-part of application Ser. No. 08/266,205, filed Jun. 27, 1994 entitled METHOD AND APPARATUS FOR CONTROLLING THE CONTACT OF OPTICAL FIBERS, the teachings of which are wholly incorporated herein by reference. This application is also related to co-pending application entitled FUSION SPLICING BLOCK, filed concurrently herewith in the name of the instant applicants, the teachings of which are also wholly incorporated herein by reference.

FIELD OF THE INVENTION

This invention relates to a tool for providing energy to heat and fuse adjacent ends of two optical fibers, and more particularly, to a tool that may be hand held, for fusing optical fibers alone or in combination with a fusion splicing block.

BACKGROUND OF THE INVENTION

In the art of fiberoptics, much effort has been devoted to designing devices for fusing together the ends of two optical fibers in a manner ensuring the proper optical performance of the resulting optical line. The teachings of the following related art are incorporated herein by reference where applicable.

Known in the art are fusion elements, usually in the form of sleeves, having built-in heating means e.g. electrodes and adapted to accommodate two exposed ends of a pair of fibers to be fused, the ends arranged along a passline. The use of such sleeves necessitates of course the supply of voltage to be applied to conductive terminals of the electrodes. An example of such a sleeve with built-in electrodes is described in U.S. Pat. No. 4,598,974 to Munn.

U.S. Pat. No. 4,319,902 to Hensel describes a device for joining optical fiber ends by positioning the end parts in vacuum-operated chucks. The chucks are forced together by means of piezoelectric elements which are operated by the power supply of a welding arc between the chucks.

Zucker, et al. U.S. Pat. No. 4,372,768, describes a method of splicing optical fibers using an apparatus also employing vacuum chucks, a fusion splicer block, an integrating cylinder and radiometer means for providing an indication of the position of the fiber ends.

Szanto et al, in U.S. Pat. No. 5,002,351, propose a fusion splicer featuring a base member with an arc region, a clamp member and a biasing arrangement. The clamp member includes three fingers each capable of imposing a different biasing force to accommodate different-sized fibers.

Still different fiber splicing devices are described in U.S. Pat. Nos. 4,199,223 and 5,146,527.

None of the prior art devices offers the possibility of releasably holding a sleeve, or other splice element having integral electrodes and adapted to retain two ends of optical fibers to be spliced in axial alignment, and supplying fusing energy to the contact area of the ends through the electrode means of the splice element. Also, none of the prior art references teaches a tool adapted to hold and supply fusing energy to inexpensive, disposable fiber-fusing splice elements.

Accordingly, there is a need for a simple and compact, preferably hand-held device for releasably securing a splice element and for providing fusing energy to the fiber ends to be fused through the electrodes of the splice elements.

SUMMARY OF THE INVENTION

According to one aspect of the invention, there is provided a tool for providing energy to heat opposed ends of a pair of optical fibers to the point of fusing the ends together, the tool comprising: a housing, preferably sized to be hand-held; means for releasably securing a splice element within the housing, the splice element adapted to accommodate the opposed ends of optical fibers in an axial relationship; and, means for providing energy such as an electric current to the splice element for heating said opposed fiber ends.

According to another aspect of the invention, there is provided a tool for fusing opposed ends of a pair of optical fibers, the tool comprising: a housing; means within the housing for releasably securing a sleeve having a heating element and forming an interior splice chamber for housing a first and second optical fiber ends such that the longitudinal axis of the sleeve defines a passline when the sleeve is secured within the housing; means for retaining end portions of the pair of the optical fibers in an axial relationship such that the longitudinal axes of the fiber ends lie substantially along the passline when the end portions of the fibers are retained; and, means for providing energy such as an electric current (energy) to portions of the sleeve so that the heating element within the sleeve can fuse the opposed fiber ends together.

In still another aspect of the invention, there is provided a tool for fusing optical fibers within a splice element which comprises a holding member having a central opening including axial alignment means for alignment of opposed ends of a pair of optical fibers, the splice element including means for applying heat to said opposed ends of the optical fibers to fuse them at an intermediate position in said opening, the tool comprising: a housing for receiving the splice element; means for releasably securing the splice element within said housing; and, means associated with the housing for providing an electric current to the splice element when the splice element is secured within the housing to fuse the optical fibers.

In yet another aspect of the invention, there is provided a tool, preferably sized to be hand-held, for fusing opposed ends of a pair of optical fibers, the tool comprising: a housing; a replaceable splice element having a heating element for applying heat to the ends of the optical fibers; means for releasably securing the replaceable splice element within the housing; and, means for providing energy such as an electric current to the heating element of the splice element to fuse the ends of the optical fibers.

Any of the above aspects of the invention can also be provided with means for indicating the relative position of the opposed fiber ends to be fused. Also, any of the above-defined embodiments of the invention can also be provided with means for controlling the contact force of the optical fiber ends using methods and apparatus such as taught in our earlier filed copending application identified above. All of the embodiments of the invention are adapted for use with fusion splicing blocks of the type identified in our co-pending application filed concurrently herewith and identified above.

BRIEF DESCRIPTION OF THE DRAWINGS

The invention will be described in greater detail by way of the following description to be taken in conjunction with the accompanying drawings, not drawn to scale, in which.

Detailed Description of the Invention

Figure 1:
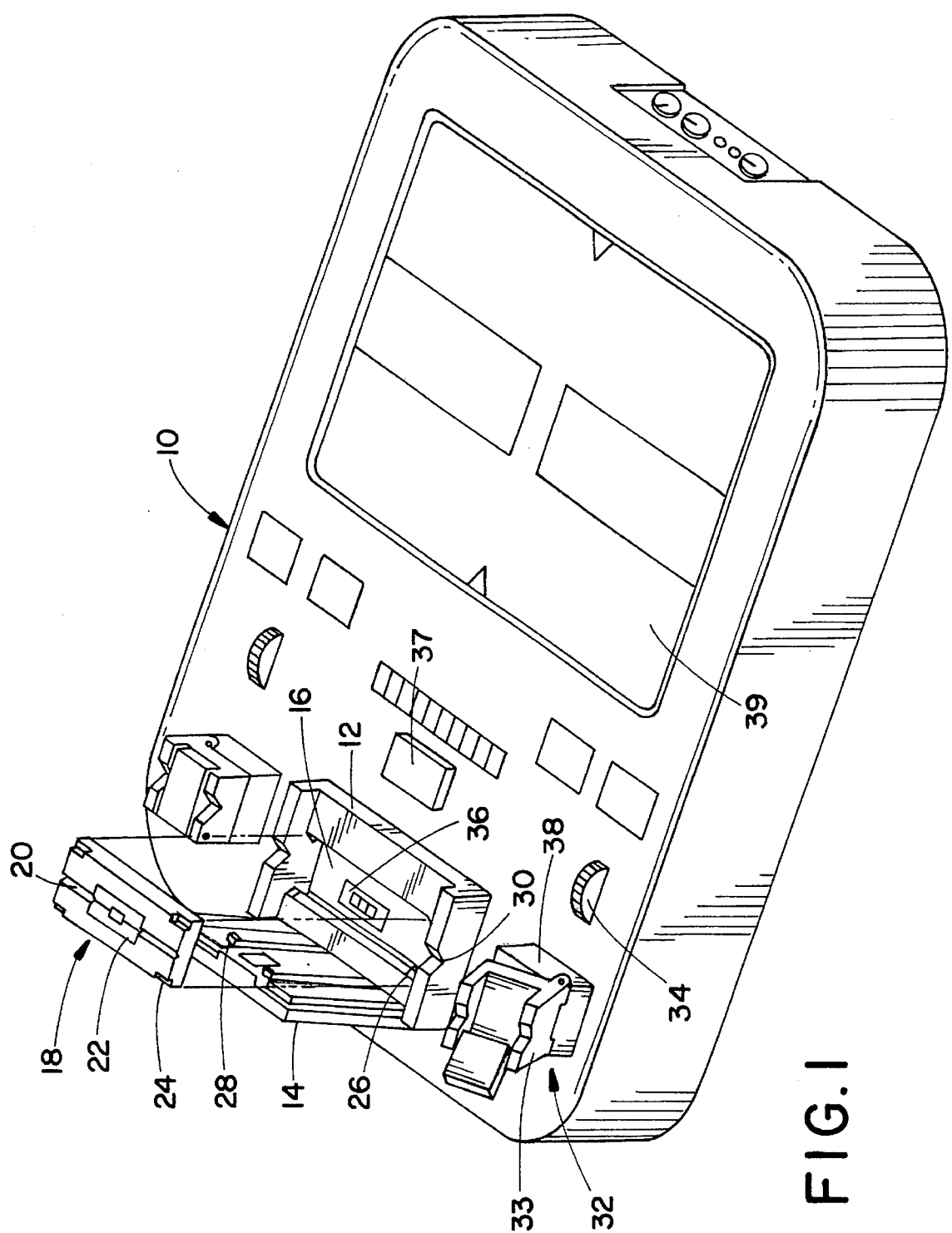
FIG. 1 is an oblique, partially exploded view of the preferred embodiment of the tool comprising the instant invention.

An exemplary hand-held tool of the present invention is generally designated as 10 in FIG. 1. The tool has a housing 12 fixed thereto, with a hinged cover 14. The housing 12 has a chamber 16 dimensioned to accommodate, with a loose fit, an electrode block holder 18 which is shown in greater detail in FIG. 4. The holder 18 features a V-groove 20 for accommodating two opposed ends of two optical fibers to be fused together, not shown in the drawing. The V-groove is a part of the fiber passline when the electrode block holder 18 with the fibers is placed in the housing 12.

The holder 18 has a ceramic block 22 which has a V-groove 23 and is built into the holder such that the V-groove 20 of the electrode holder is aligned with the V-groove 23 of the ceramic electrode block 22. Ceramic block 22 is the subject of the co-pending United States patent application identified above. A viewing cavity 25 is provided in the electrode block 22 and disposed to enable the viewing of the opposed ends of the two optical fibers when placed in the electrode block holder 18.

Figure 3:
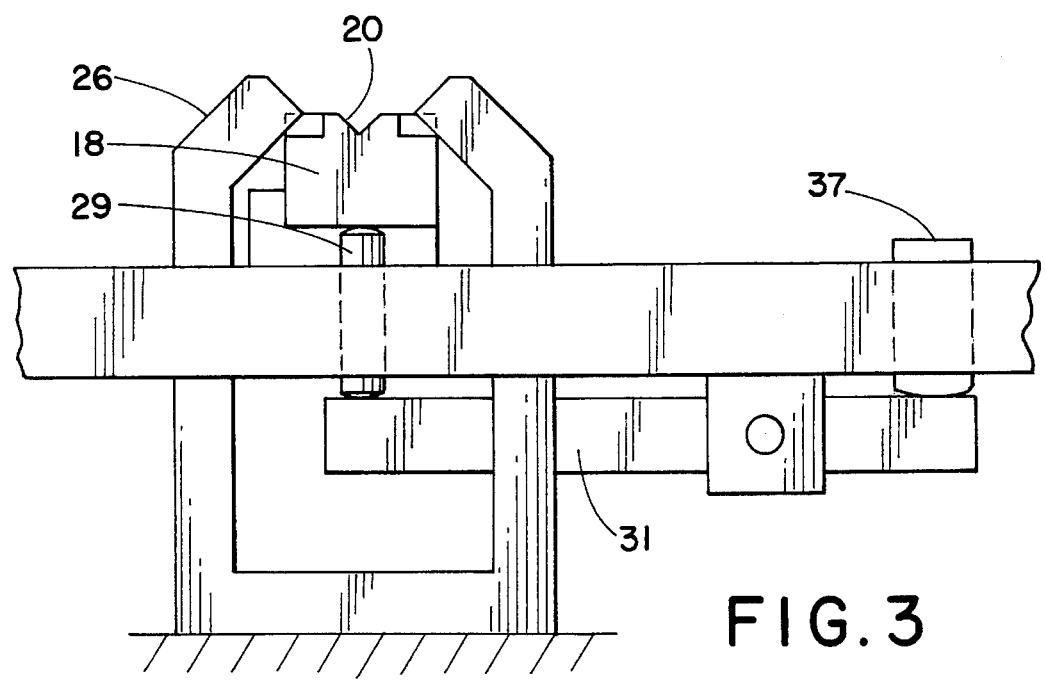
FIG. 3 is an enlarged side view of the chamber of the tool of FIG. 1 showing the eject mechanism.

The electrode block holder 18 is provided with four recesses 24 at the upper corners, the recesses serving to enable the retention of the holder 18 in the housing 12 of the tool 10. The chamber 16 is provided with four clamps 26 that are positioned to engage the four recesses 24 when the electrode block holder 18 is placed in the chamber 16, thereby holding down the block holder 18 in the chamber 16, as best shown in FIG. 3. It can be seen that the block holder is placed in position by forcing it between the snap-in clamps 26.

Figure 4:
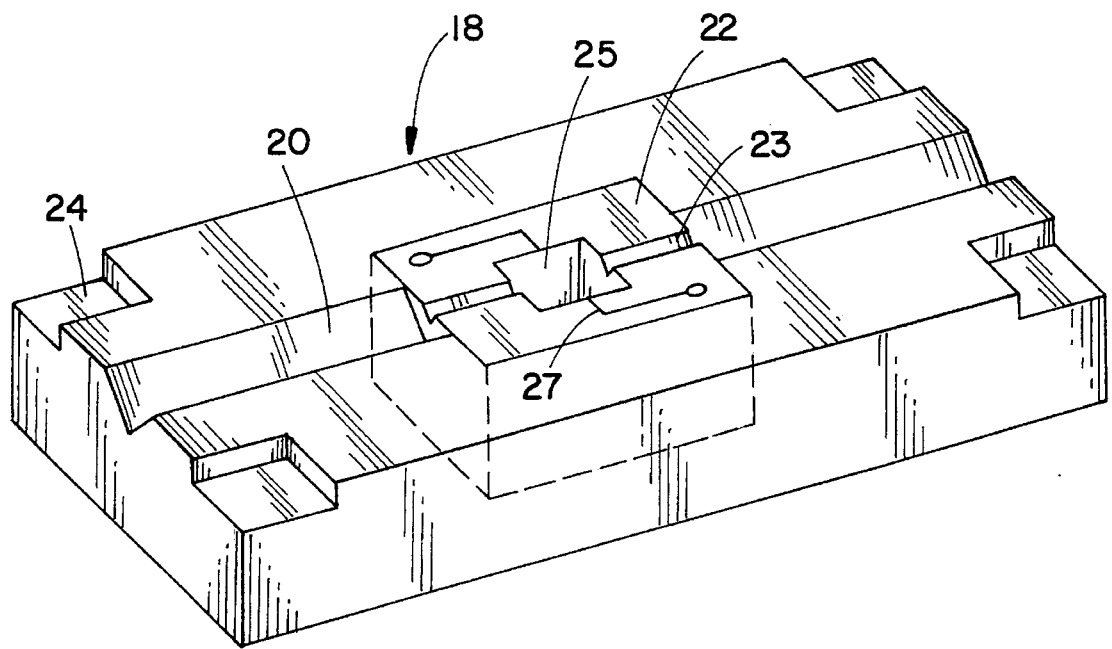
FIG. 4 is a magnified view of the electrode block holder of FIG. 1.

As shown in FIG. 4, the electrode block 22 has two electrodes 27 with their tips extending into the viewing cavity 25 where the ends of the opposed fibers are placed before fusing.

The cover 14 is provided with hold-down clamps 28 shaped for instance as leaf springs, their position on the cover being such as to be aligned with and hold down the end portions of the two fibers to be fused when the electrode block holder 18 with the fibers is placed in the chamber 16 and the cover 14 is closed.

The chamber further has two notches 30 disposed so as to be aligned with the fiber passline as defined above. Further, two fiber advancement manipulators 32 are mounted on the tool 10 along the passline on two sides of the chamber 16. The manipulators have chucks for immobilizing the respective fiber portions therein and serve to advance the fiber ends toward each other. Each manipulator 32 has a base member 38 and a movable carriage 33 the position of which relative to the stand, along the passline, can be controlled with knobs 34. The manipulators 32 and carriages 33 are adoptable for use in combination with method and apparatus for controlling the contact force of the optical fibers ends such as set forth in our earlier co-pending application noted above.

Figure 5:
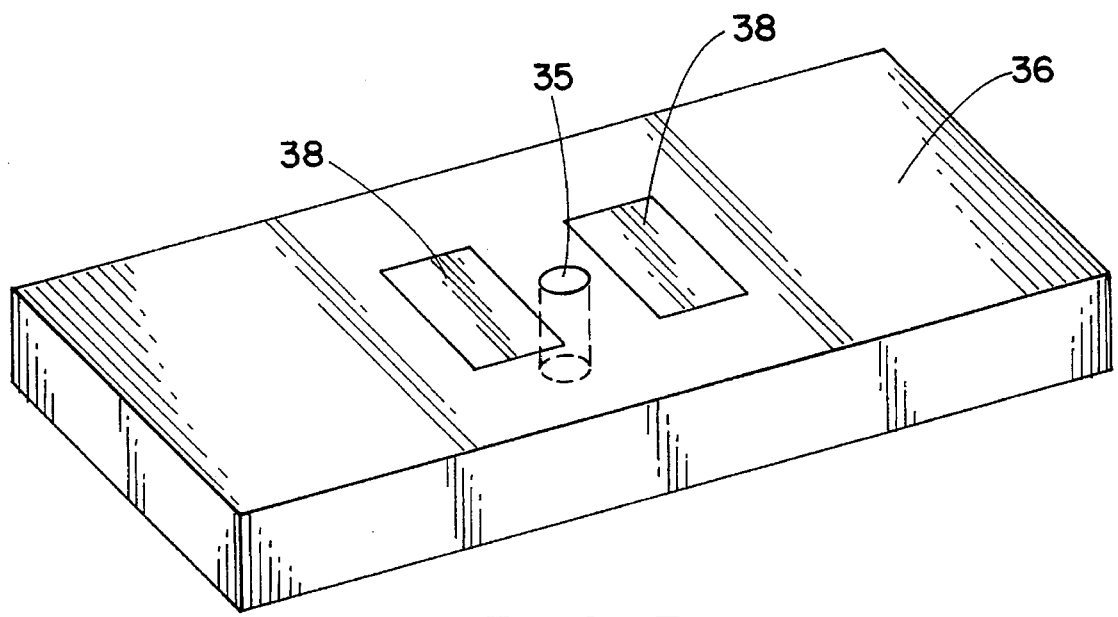
FIG. 5 is an enlarged view of the bottom part of the chamber of FIG. 1.

As illustrated in greater detail in FIG. 5, there is provided on the bottom of chamber 16 a heat-conductive plate 36 which serves as a heat sink. Further, two electrical contacts 38 are mounted in the chamber 16, the contacts 38 being connected to a source of electric current, not shown, and positioned to be in electrical contact with electrodes of the ceramic electrode block 22. A viewing port 35 is provided between the electric contacts 38. The port 35 is in alignment with the viewing cavity 25 when the electrode block holder 18 is placed in the chamber 16.

As mentioned above, the chamber 16 is dimensioned to accommodate the electrode block holder 18. When the holder 18 is placed in the chamber 16 with the cover 14 closed, the V-grooves in the block holder 18, the electrode block 22, the notches 30 and the manipulators 32 are in alignment along the fiber passline.

The tool 10 has ejection means (FIG. 3) exemplified by an eject pin 29 which is manually activated, via a linkage 31 mounted in the bottom of the chamber 16, by push-button 37, for ejecting the electrode block holder 18 from the chamber when the fusion of the fiber ends is complete.

For monitoring the relative position of the two opposed fiber ends before fusing, the tool 10 has a LCD display 39, the design and functioning of which is known in the art. Alternatively, indicia in the form of control lights can be provided to enable a visual control of the fiber positioning and fusion process.

In operation, the electrode block holder 18 is placed in the chamber 16 and the respective ends of a pair of fibers are placed in the carriages 33 of the manipulators 32 and in the V-grooves of the block holder 18 and the electrode block 22. The ends are brought in a close proximity by operation of the knobs 34 of the manipulators 32. The position of the ends is monitored on the LCD display. When the fibers are positioned, an electric current is supplied to the electrode contacts 38 from a power supply known in the art, to create an arc between the tips of electrodes 27 of the electrode block 22 and fuse the ends of the two fibers together. Subsequently, the cover 14 is opened and the ejection mechanism is activated to eject the holder with the spliced pair of fibers. Depending on the type of the splice element (sleeve or an open flat element), it can either stay with the fused fibers, remain in the hand-held tool or can be discarded.

It is an advantage of this embodiment that the splice element which has integral electrodes can be discarded after one or a few fusing operations without a need for cleaning the electrodes which is usually the case in the prior art devices.

Figure 2:
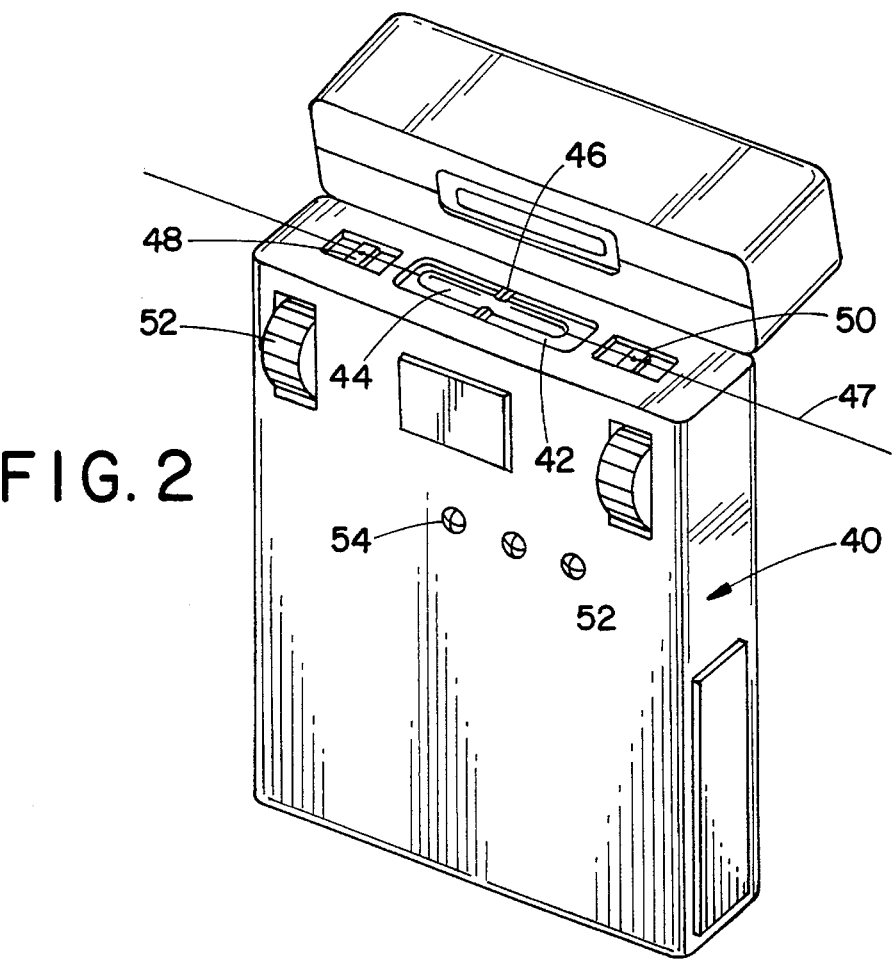
FIG. 2 is an oblique view of an alternative preferred embodiment of the tool.

In another embodiment of the tool of the invention is illustrated in FIG. 2, the tool 40 has a chamber 42 which is dimensioned to accommodate a fiber-splicing sleeve 44. The sleeve 44 has a bore for introducing two opposed ends of optical fibers 47 to be fused (not shown) and two built-in electrodes (not shown). Two electrode contacts 46 are mounted in the chamber 42 so as to be in electrical contact with the electrodes of the sleeve 44. The tool has two clamps 48, 50 in axial alignment with the sleeve 44 when placed in the chamber 42. The clamps are movable along the longitudinal axis of the sleeve 44 for advancement of the fiber ends towards each other. The movement of the clamps are controlled with thumb rollers 52.

The tool 40 is provided with status indicia 54 and with sleeve ejection means similar to that in the tool 10 of FIG. 1 and not shown in the drawings.

Various modifications and combinations of the above-described features are may occur to those skilled in the art and such modifications and combinations as well as equivalents thereof are intended to form part of the present invention which is defined by the appended claims.

Having thus described the invention, we now claim:

1. A tool for providing energy to heat optical fibers within a splice element comprising:

a housing;

means for releasably securing a splice element within a chamber of the housing; and, an electrical contact on the housing for registering with the splice element and providing an electrical current to the splice element when said splice element is secured within the housing for heating ends of the optical fibers positioned within the splice element.

2. A tool for providing energy to heat optical fibers as defined in claim 1 wherein the electrical contact for providing electrical current is electrically connected to a pair of electrodes located adjacent a fusion cavity within the splice element, when the splice element is secured within the housing.

3. A tool for providing energy to heat optical fibers as defined in claim 2, wherein the housing includes ejecting means for ejecting the splice element, said means ejecting being operable when the means for releasably securing the element is in a releasing position.

4. A tool for providing energy to heat optical fibers as defined in claim 2, further comprising moving means for moving ends of the optical fibers relative to one another, said moving means being located on either side of the chamber.

5. A tool for fusing optical fibers comprising:

a housing;

means within the housing for releasably securing a splice sleeve forming an interior splice chamber for holding ends of a first optical fiber and a second optical fiber such that a longitudinal axis of the sleeve lies along a passline when the sleeve is secured;

means for retaining end portions of the first and second optical fiber in alignment such that the longitudinal, axes of the fiber ends lie substantially along the passline when the fibers are retained;

an electric contact on the housing and engagable with the splice sleeve for providing an electric current to portions of the sleeve so that a heating element within the sleeve heats and fuses the first and second optical fibers together.

6. The tool as defined in claim 5, further comprising means for moving the optical fibers relative to one another.

7. The tool as defined in claim 5, wherein:

the splice sleeve includes a pair of electrodes, and the electric contact includes at least two conducting contact portions each for making electrical contact with at least one of the pair of electrodes, when the splice sleeve is secured within the housing.

8. The tool, as defined in claim 7, further comprising means for ejecting the splice sleeve from the tool when it is secured within the housing.

9. The tool according to claim 7 further comprising a power supply connected to said at least two conducting contact portions.

10. The tool as defined in claim 6 wherein the means for moving the optical fibers relative to one another includes a pair of manually operable members, each of the pair of manually operable members being connected to an optical fiber clamp block disposed on the housing along the passline, each optical fiber clamp block for clamping and relatively advancing the optical fibers in response to movement of the pair of manually operable members.

11. A tool for fusing optical fibers within a splice element including a holding member having a central opening including axial alignment means, for alignment of opposed ends of a pair of optical fibers, said splice element including means for applying heat to said opposed ends of the optical fibers to fuse them at an intermediate position in said opening, the tool comprising:

a housing having a chamber adapted to receive a fiber splice member;

means for releasably securing the splice member within the chamber; and, means within the housing for providing an electrical current to the splice member when it is secured within the chamber, to fuse optical ends disposed in the splice member.

12. The tool as defined in claim 11 further comprising means for retaining end portions of the pair of optical fibers in alignment such that the longitudinal axes of the fiber ends lie substantially along a passline when the fibers are retained.

13. The tool as defined in claim 11, further comprising indicia for indicating a fusion state.

14. The tool according to claim 13 wherein said indicia comprises a human readable signal device for generating a human readable signal corresponding to a level of said electric current.

15. The tool according to claim 14 wherein the human readable signal device includes a plurality of light emitting members.

16. A tool for fusing optical fibres comprising:

a replaceable splice element for splicing first and second optical fibers;

a housing;

means within the housing for releasably securing the replaceable splice element to the housing;

means for providing an electric current to portions of the splice element through corresponding electrical connections on the splice element and housing so that a heating element on the splice element heats and fuses the first and second optical fibers together.

17. A system for heat fusing optical fibers comprising:

an electrode block holder having an integral electrode and a first electrical contact connected to the integral electrode;

a housing adapted on a first portion for receiving the electrode block holder;

a latch for releasably securing the electrode block holder to the first portion of the housing; and, a second electrical contact disposed on the housing in said first portion, the second electrical contact being adapted to engage said first electrical contact for communicating electrical energy from the housing to the electrode block holder.

18. The system according to claim 17 wherein said electrode block holder includes:

means defining an optical fiber passline;

a pair of internal electrodes spaced apart at said passline; and, a pair of first electrical contacts connected to the pair of spaced apart internal electrodes.

19. The system according to claim 18 further comprising at least one fiber movement manipulator on the housing along said passline for holding a first optical fiber and moving the first optical fiber relative to said first portion of the housing.

20. The system according to claim 19, wherein said at least one fiber movement manipulator includes:

a movable carriage adapted for movement along said passline in response to a manual input; and, a chuck on the movable carriage for clamping said first optical fiber.

21. The system according to claim 20 further comprising a second fiber movement manipulator on the housing along said passline for holding a second optical fiber and moving the second optical fiber relative to said first portion of the housing.

22. The system according to claim 21 wherein said second fiber movement manipulator includes:

a movable carriage adapted for movement along said passline in response to a manual input; and, a chuck on the movable carriage for clamping said second optical fiber.

23. The system according to claim 18 further comprising a power supply in the housing in electrical communication with said second electrical contact disposed on the housing.

24. The system according to claim 18 wherein:

said electrode block holder is formed of a nonconductive material; and, each of said pair of internal electrodes is connected to a one of said pair of first electrical contacts.

25. The system according to claim 24 wherein:

said electrode block holder is formed of a ceramic material; and, said housing includes a heat sink at said first portion.

* * * * *